United States Patent
Honert et al.

(10) Patent No.: US 8,653,163 B2
(45) Date of Patent: Feb. 18, 2014

(54) COATED AGGREGATE FOR PRODUCING CONCRETE

(75) Inventors: Dieter Honert, Dielheim (DE); Hans Knauber, Eppelheim (DE); Julia Hillenbrand, St. Leon-Rot (DE)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/521,918

(22) PCT Filed: Jan. 12, 2011

(86) PCT No.: PCT/EP2011/050340
§ 371 (c)(1),
(2), (4) Date: Aug. 13, 2012

(87) PCT Pub. No.: WO2011/086095
PCT Pub. Date: Jul. 21, 2011

(65) Prior Publication Data
US 2013/0005865 A1    Jan. 3, 2013

(30) Foreign Application Priority Data
Jan. 15, 2010  (EP) .................................... 10150873

(51) Int. Cl.
*C08K 3/00*      (2006.01)
*C04B 24/26*     (2006.01)

(52) U.S. Cl.
USPC .................................. 524/5; 524/4; 524/429

(58) Field of Classification Search
USPC .................................................. 524/5, 4, 429
See application file for complete search history.

(56) References Cited

U.S. PATENT DOCUMENTS 6,143,808 A    11/2000    Sack et al.

FOREIGN PATENT DOCUMENTS

| EP | 0 754 657 A1 | 1/1997 |
|---|---|---|
| EP | 1 180 530 A2 | 2/2002 |
| EP | 1 182 179 A2 | 2/2002 |
| EP | 2 067 753 A1 | 6/2009 |
| JP | A-62-288146 | 12/1987 |
| WO | WO 97/09282 | 3/1997 |

OTHER PUBLICATIONS

English translation of JP 62-288146. Dec. 1987.*
Aug. 16, 2012 International Preliminary Report on Patentability issued in International Patent Application No. PCT/EP2011/050340.
May 27, 2011 International Search Report issued in International Patent Application No. PCT/EP2011/050340.

* cited by examiner

*Primary Examiner* — John Uselding
(74) *Attorney, Agent, or Firm* — Oliff PLC

(57) ABSTRACT

The subject matter of the invention are coated aggregates for producing concrete and methods for the production thereof. The invention also relates to concrete compositions for producing concrete and concrete provided with aggregates, production methods and the use of organic polymers for the improvement of the stability of concrete.

10 Claims, No Drawings

COATED AGGREGATE FOR PRODUCING CONCRETE

The invention relates to coated aggregates for producing concrete and to a method for the production thereof.

PRIOR ART

Often, mixtures of cement and aggregates are used in the production of concrete. Generally, the aggregates are mineral additives in particle form, such as sand, gravel, greywacke or opal sandstone. Such aggregates are also called stone aggregate.

In the production of concrete with aggregates it is necessary to adjust the aggregates to the cement, so that the concrete has sufficient stability. A special problem in the production of concrete with aggregates is the occurrence of the alkali-silica reaction (ASR, also known as alkali reaction or concrete cancer). This refers to a chemical reaction in the cured concrete between alkalis of the cement, alkaline soluble silicic acid and water in concrete aggregates. The reaction can—especially in a humid environment—lead to cracks and other damage of concrete composites. Especially aggregates containing amorphous or microcrystalline silicates, such as for example opal sandstone or flint, are considered alkali-sensitive.

According to prior art, lithium nitrate can be added to the concrete to avoid the ASR. One assumes that the diffusion of sodium or potassium ions in the aggregates is responsible for the ASR. Due to their better diffusion properties, the added lithium ions enter into the aggregates instead of sodium and potassium ions. There, aqueous lithium silicates are formed, which have a relatively small crystal volume and do not lead to an expansion of the concrete. Conversely, the ASR results from the higher volume of potassium and sodium silicates, leading to an expansion of the concrete and to the formation of cracks and other damage. The use of lithium composites to inhibit the ASR, for example, is disclosed in WO 97/09282.

However, the use of lithium composites is disadvantageous, since they are comparatively expensive. In general, the global lithium deposits are limited. On the other hand, there is a high demand for batteries, amongst other uses. Another problem with the use of lithium nitrate is that it is not exactly known for a specific concrete mix which amount of lithium nitrate should be used. The lithium need depends on the specific properties of the cement and of the aggregate, such as silicate content, porosity and pH, but especially on the content of alkali ions in percent, in particular potassium and sodium ions indicated as $Na_2O$ equivalent. However, usually it is too expensive for the user to conduct test series before the production of the concrete.

To avoid the ASR, JP62-288146 proposes to provide the aggregates with a polymer coating. The coating is done with mixtures comprising relatively low polymer contents of 10% and partially organic additives such as asphalt or petroleum. This is not very procedurally efficient and not ecologically desirable. Therefore, it is not shown that with the aggregates processed in this manner an inhibition of the ASR is achieved and that the aggregates are stable for a longer period.

EP 2 067 753 A1 discloses aggregates coated with polymers. The coating is supposed to stabilize the concrete against mechanical stresses.

U.S. Pat. No. 6,143,808 discloses powders with micro particles equipped with polymers providing a building material with insulating properties.

OBJECT OF THE INVENTION

The invention is based on the problem to provide uses, methods and compositions, which overcome the above described disadvantages. It shall in particular provide a method for producing concrete, in which the alkali-silica reaction is avoided without the necessity of the addition of lithium compounds as concrete additive. The concrete shall have good stability and shall, in the long term in presence of humidity, also not show any undesired changes such as cracks or other material defects caused by alkaline reactions in the concrete interior. The method shall be used in a simple manner for different cement and aggregates.

EMBODIMENT OF THE INVENTION

Surprisingly, the underlying problem of the invention is solved by uses, coated aggregates, concrete compositions and concrete, as well as production methods pursuant to the patent claims.

The subject matter of the invention is the use of concrete aggregates comprising a coating with organic polymers to improve the stability of concrete against the alkali-silica reaction.

The aggregates are preferably produced by bringing a mineral aggregate in contact and mixing it with a polymer dispersion so that the surface of the aggregate is coated with a polymer film. Subsequently, the polymer film is cured.

Aggregates for concrete are understood as a mixture of grains from natural and artificial sources. In general, mineral additives are used. Aggregates for concrete have to have a sufficient resistance to weathering and shall not swell, disintegrate or chemically react in a concrete composition. Stone aggregates for concrete and their properties are defined and measured according to EN 12620.

In preferred embodiments of the invention the aggregate is selected from sand, gravel and crushed stone (e.g. consisting of flint, greywacke, sandstone, siliceous chalk and/or limestone).

In the production of a concrete composition the concrete aggregate is selected in such a way that the concrete has the necessary firmness. Pursuant to the invention, normal aggregates, light aggregates or heavy aggregates can be used. Normal aggregates are defined as such with a gross density of 2,200 through 3,200 $kg/m^3$, light aggregates as such with a density of less than 2,200 $kg/m^3$ and heavy aggregate as such with a density of more than 3,200 $kg/m^3$.

In preferred embodiments of the invention the medium grain size of the aggregate is between 0.5 and 100 mm, especially between 2 and 50 mm, between 5 and 50 mm or between 8 and 40 mm, determined by EN 12620.

In a preferred embodiment of the invention the medium grain size of the aggregate is between 8 and 40 mm, especially between 8 and 32 mm or between 8 and 22 mm. Crushed stone of 8 through 22 mm is often used in road construction and in other concrete buildings gravel between 8 and 32 mm. Pursuant to the invention, the ASR can be avoided especially efficiently if such aggregate fractions are coated. Additional aggregates can be added to the concrete, which are not alkali-sensitive and therefore do not require coating. In a preferred embodiment outside the referenced preferred areas aggregates can also be added which are not coated pursuant to the invention. Surprisingly, regardless of this, a stabilization of the concrete against ASR can be achieved.

A polymer film, which is cured, is produced on the aggregate. The film can also be created through known methods, for example by spraying or dipping in polymers or compositions containing the polymers. The polymer film created on the aggregate in this manner is cured, for example by drying. The coating can consist of any polymers, for example thermoplastic polymers or chemically cured polymers, such as epoxy resins and polyurethane resins.

Coating is particularly preferred with a polymer dispersion (polymer latex). This describes a colloidal stable dispersion of polymer particles in an aqueous phase. For example, the diameter of the polymer particles can be between 10 nm and 5 μm. The colloidal stability of a polymer dispersion is often achieved through surface active agents, such as tensides or protective colloids. Polymer dispersions are available commercially and are for example used as glue and binders.

Suitable polymer dispersions for coating are such which are commonly used to modify mineral components. The polymer dispersion used pursuant to the invention is a film building agent. Pursuant to the invention, an aqueous dispersion is used preferably. Polymer dispersions, which form thin films on solid surface, are known in the pri- or art. After building a film on the aggregates, the polymer dispersion should no longer be redispersable. It is selected in such a way that a homogenous thin film is formed on the grains of the aggregate, which has as little gaps as possible or none at all. Pursuant to the invention, it was found that alkali-sensitive aggregates, for example with medium grain sizes between 8 and 22 mm can be coated with a very thin polymer layer. This hinders sodium and potassium ions from entering into the aggregate. Thus, the layer pursuant to the invention is also stable if a high pH is reached in the concrete. When the coated aggregate is used according to the invention, it is therefore not necessary to add lithium composites, especially lithium nitrate, to a concrete composition. Pursuant to the invention, the alkali-silica reaction can be completely prevented through the polymer coating. The coating is preferably done in the absence of an organic solvent. Adding other inert coating or binding agents, such as wax or asphalt, is not necessary.

For example, pursuant to the invention, a polymer dispersion, preferably an aqueous polymer dispersion, is used, which has a polymer content of 5-60% by weight, especially 8 through 40% by weight or 10-25% by weight. The polymer dispersion should be sufficiently thin to achieve a homogenous and simple surface coating. On the other hand, the polymer dispersion should not be too thin, so that the drying process does not consume too much energy and takes too long and so that the polymer film is formed as evenly and free of gaps as possible. A suitable consistency is usually easy to set with known polymer dispersions.

Preferably, the dispersion is an aqueous polymer dispersion. It was found that the coating can be done especially effectively if the coating is done in an aqueous polymer dispersion, which has a polymer content of more than 10% by weight, more than 20% by weight, especially more than 25% by weight or more than 30% by weight. At this, the polymer content is for example between 10 and 60% by weight, between 20 and 60% by weight, between 25 and 60% by weight or between 30 and 60% by weight. These concentrations achieve a sustainable and effective coating, and simultaneously the removal of the water in the process requires little time and energy. Aqueous polymer dispersions usually contain a small content of a dispersion agent for stabilization, especially an emulsifier, for example in an amount of 0.1 to 5% by weight or 0.5 to 2% by weight.

Suitable are especially copolymers of styrene, butadiene, ethylene, acrylate, methacrylate, crotonate, vinyl acetate, vinyl versatate, vinyl laurate, methacrylamide and/or acrylamide as well as epoxides and polyurethanes. The polymers can be, as the case may be, chemically modified, for example through carboxylation. In preferred embodiments of the invention the polymer is a styrene-butadiene copolymer or a styrene-acrylate copolymer, which can also be carboxylated.

Such polymers can be obtained by emulsion polymerization of ethylenically unsaturated monomers, such as styrene and butadiene, or (meth)acrylates.

Styrene-butadiene copolymers for example have a monomer composition 50 to 90% by weight of styrene and 10 to 50% by weight of butadiene and can contain, as the case may be, even smaller amounts, e.g. 1 to 5% by weight of acrylic acid, methacryl acid, acrylamide or methacrylamide in relation to all monomers. Suitable polymers and dispersions are described, for example, in EP-A-754657.

Suitable are for example polymer dispersions containing a copolymer, which as a monomer contains esters of acrylic acid with C2-C12-alkanoles, such as ethylarcylate, n-butylacrylate or 2-ethyihexylacrylate, vinyl aromatic monomers, such as styrene, or esters of methacryl acid, especially with C1-C4 alkanola, such as methylacrylate. The copolymers can, as the case may be, contain monomers with ureylene or thiourea groups, such as ureido ethylene methacrylate or hydrolysable silicon groups, such as 3-methacryloxy propyl trimethyoxysilan. Suitable polymer dispersions and their production methods are for example also described in EP-A 1180530 or EP 1182179.

Spraying, dipping and drumming are especially suitable methods to apply the polymer solution or polymer dispersion to the aggregate. Common mixing devices are suitable to mix and evenly coat, especially drum mixers. The application and the mixing are done in such a way that the particle surfaces are coated as completely as possible. The amount to be applied depends on the type of the polymer film and the aggregate. When polymer dispersions are used, usually a coating amount (dry) of 1 to 100 g/kg aggregate, preferably of 5 to 50 g/kg, especially preferred of 5 to 30 g/kg aggregate are sufficient for an efficient effect. After the complete application, the coating is cured. Polymer dispersions can usually be cured in a simple manner by drying. This can for example be done by applying the aggregate to a foil or a metal screen. The drying time can for example be 10 minutes to 3 hours, in particular around one hour, and can be additionally accelerated by aeration and/or temperature increase.

In preferred embodiments of the invention the medium thickness of the polymer film is less than 100 μm, preferably less than 50 μm or less than 20 μm, especially preferred less than 10 μm or less than as 5 μm. However, the polymer film has to have a sufficient thickness to prevent the diffusion of the sodium and potassium ions in the aggregate. Preferably, the polymer film has a medium thickness of at least 2 μm, at least 5 μm or at least 10 μm.

In a preferred embodiment the layer thickness is between 10 and 20 μm. It was found that in this area an especially efficient stabilization of an aggregate against ASR can occur, especially in the case of aggregates with a medium grain size between 8 and 40 mm, especially between 8 and 32 mm or between 8 and 22 mm.

The medium layer thickness of the coated aggregate can be controlled through solid body content of the used dispersion. The layer thickness is preferably determined by pre-tests on a metal grid. The DUALSCOPE MP0 by the company Fischer is used for the determination according to DIN EN ISO 2178.

In a preferred embodiment of the invention the coating contains at least one additive providing the coating at least one functionality. In this way, the coating can not only be used as a barrier against the ASR, but also as a substrate. The functionality is an additional functionality, which the aggregate would not contain without the additive. In one embodiment the functionality has an effect in the concrete or in the concrete composition. Thus, the aggregate can be equipped with special properties, for example such, which are otherwise effected by components of the concrete composition. In this way, the additives can be positioned in a targeted manner in immediate vicinity to the aggregates and unfold an effect there. In a special embodiment the additive diffuses from the coating and unfolds its effect outside the coating.

The additive can for example be worked into the coating, if it is homogenously mixed with the polymer dispersion before it cures. In this case, the polymer and the polymer dispersion are selected in such a way that the homogenous mixing is possible, for example under consideration of the surface charge and/or hydrophily of the polymers.

Preferably, the at least one additive is selected from a colorant, a lithium salt and a crown ether.

The incorporation of a colorant in the coating has the advantage that a simple, especially visual control of the coating is possible. The described polymer coatings are usually thin and colorless or whitish. When adding a colorant it can be examined during the coating process or afterwards if the coating was done evenly and completely. Furthermore, at a later time, for example after storage or at the time of further processing, it can easily be examined if the coating is stable.

The incorporation of lithium salts, especially in the form of lithium nitrate, in the coating is done to support the inhibition of the ASR. As stated above, the addition of lithium ions to concrete compositions is known to inhibit the ASR. The incorporation in the polymer coating pursuant to the invention is, however, advantageous, since the lithium ions are positioned in a targeted manner onto the aggregate and are not distributed in the entire concrete composition. In addition, in a polymer the diffusion of the ions is also easier to control and to adjust than in the cured concrete. This can achieve a significant reduction of the lithium amount, which is a big advantage due to the relatively high price and the large amounts which are necessary for the concrete processing.

The incorporation of crown ethers in the coating also serves to support the inhibition of the ASR. In this context crown ethers are selected, which fixate ions such as potassium or sodium ions, which cause the ASR in the aggregates.

The subject matter of the invention is also a concrete composition comprising
  (a) at least one cement,
  (b) at least one coated aggregate, wherein the coating at least has one additive providing at least one functionality to the coating, and
  (c) as the case may be, concrete additives and/or concrete admixtures.

Cement is defined as inorganic, finely ground materials, which independently stiffen and cure after mixing with water due to chemical reactions. Pursuant to the invention, any cement can be used, which is commonly used for producing concrete.

Pursuant to the invention, the term "concrete composition" describes a cured composition in powder form or in the form of a suspension suitable for further processing into a solid concrete mould. At this, the cement can still be mostly dry or already partially or completely blended with water. The cement can be completely or partially hardened.

Additives in powder or liquid form which affect certain properties of the concrete are called concrete additives. Common concrete additives are for example mineral fine materials, inert fine materials, fly ash, color pigments, fibers and organic materials, such as synthetic resin dispersion. Commonly, concrete additives are considered in the compilation of the concrete's recipe as volume components.

Materials dissolved or suspended in water are described as concrete admixtures, added to the concrete to change the properties of the fresh or hardened concrete, such as workability, setting properties, curing or durability. Commonly, concrete admixtures are such pursuant to EN 934, for example concrete plasticiser, flow improvers, stabilisers, accelerators, hardening accelerators, retarders, sealants, plasticisers and flow improvers.

In a special embodiment of the invention, a lithium salt, especially lithium nitrate, is contained in the concrete composition and/or in the polymer dispersion itself. As explained above, if a coated aggregate pursuant to the invention is used, the use of lithium nitrate is not strictly necessary, since the coating pursuant to the invention inhibits the ASR. However, in individual cases or certain types of use it can be advantageous to add a lithium compound as an additional safeguard, for example if a special long-term stability of especially reactive aggregates is to be achieved.

In a special embodiment of the invention, the concrete composition and/or the polymer dispersion contain a crown ether. In one preferred embodiment, the crown ether can be copolymerized in the polymer layer. Crown ethers are cyclic ethers, which form stable complexes with alkali or alkaline earth ions. Crown ethers, which form stable complexes with sodium and potassium ions are used preferably. Dicyclohexano[18]crown-6 is for example especially suited to fixate potassium ions in the concrete or in the polymer layer. If crown ether pursuant to the invention is used, sodium and potassium ions can be fixated in the concrete or in the polymer layer, so that the ASR is additionally hindered.

The subject matter of the invention is also a method for the production of concrete comprising the steps of
  (A) mixing of the components (a) through (c) of a composition pursuant to the invention,
  (B) moulding and
  (C) curing to a concrete.

In step (B) "moulding" means that the composition is processed into any three-dimensional shape, for example a road surface, a fill or a formed building component. Moulding can be done with the help of formwork parts or a mould, but also by spreading etc. In the method pursuant to the invention additional aggregates can be used, which are not coated. For example, only such aggregates can be coated in the concrete composition, which tend to have an ASR due to their nature.

The subject matter of the invention is also concrete, which can be achieved by curing of the concrete composition pursuant to the invention or through a method pursuant to the invention.

Concrete is a building material with versatile uses, produced from mixtures of cement, aggregates and water. Pursuant to the invention, the aggregate can be used in any known type of concrete.

The aggregate pursuant to the invention is especially suitable for concrete compositions comprising a high effective alkali content. For example, the effective alkali content can be larger than 1%, especially larger than 1.5% or larger than 2.5% ($Na_2O$-equivalent pursuant to DIN 1164-10).

The uses and aggregates pursuant to the invention solve the underlying tasks of the invention. If the coated aggregates are used, the ASR can be prevented or at least significantly affected. The use of lithium composites is no longer necessary. The coating prevents the ASR independent of the used cement and the overall composition. Regardless of this, the concrete has good, consistent material properties. Thus, material damage, such as cracks or embrittlement caused by the ASR does not occur in case of humidity or throughout long periods of time or is significantly diminished.

EXAMPLES OF EMBODIMENTS

Example 1

Coating of an Aggregate

Crushed stone with grain size 8/11, 11/16 and 16/22 by Mitteldeutsche Baustoffe GmbH, Werk Harzer Grauwacke Rieder or crushed stone (shell limestone) with grain size 8/16 by the company Schotterwerk Gfrörer & Sohn, Schotterwerk Fischingen or fine grit with grain size 8/11 and 11/16 from the Upper Rhine area are used as an aggregate for coating. 8-11 mm aggregate, 11-16 mm aggregate and 16-22 mm aggregate are coated separately from one another. To do so, in each case 25 kg of an aggregate are filled into a type LESCHA SM 145 S "free fall mixer". Subsequently, 0.5 kg of a polymer dispersion of carboxylized butadiene-styrene copolymer (Synthomer 29Y41, company Synthomer, solids content 47%) is added. The fill opening of the mixer is equipped with a sieve closing and subsequently mixed for 90 seconds at a speed of 64 rpm. This time is sufficient to completely cover the aggregate. Afterwards, the remaining emulsion runs through the sifting device into a collecting vessel and drips off. The aggregate is subsequently taken out and broadly poured out onto a PE tarp, where the drying process is carried out.

Example 2

Production of Concrete

Road concrete is produced with the coated aggregates produced pursuant to Example 1. The following road concrete recipe is used for the fog chamber tests and mixed as follows: 542 kg/m$^3$ 0-2 mm aggregate (Rhine sand by the company KVB Kies-Vertrieb GmbH & Co. KG, Karlsdorf-Neuthard, plant Waghäusel), 217 kg/m$^3$ 2-8 mm aggregate (Rhine gravel by the company KVB Kies-Vertrieb GmbH & Co. KG, Karlsdorf-Neuthard, plant Waghäusel), 238 kg/m$^3$ 8-11 mm aggregate (from the Upper Rhine area, coated pursuant to Example 1), 274 kg/m$^3$ 11-16 mm aggregate (from the Upper Rhine area, coated pursuant to Example 1), 542 kg/m$^3$ 16-22 mm aggregate (crushed stone by the company KVB Kies-Vertrieb GmbH & Co. KG, Karlsdorf-Neuthard, plant Oberhausen-Rheinhausen) mixed with 71.5 kg/m$^3$ water (city water, Leimen) for 30 seconds in a cyclone compulsory mixer. This is followed by a 180 seconds vacuum break. Then, 350 kg/m$^3$ Portland cement (CEM I 42,5 R, company HeidelbergCement, plant Weisenau/Mainz), 71.5 kg/m$^3$ water (city water, Leimen) and, if needed, also approx. 0.1 to 0.5% concrete admixtures (Sika air entraining agent LPS A-94 based on synthetic tensides by the company Sika Deutschland GmbH, Leimen and Sika flow agent FM 31 based on polyacrylate by the company Sika Deutschland GmbH, Leimen) is added and mixed again for 120 seconds, wherein the amount of the concrete admixtures is adjusted in such a way that the flow spread equals 340 mm (according to DIN EN 12350-5). The concrete will be cured.

Example 3

Examination of the Alkali-Sensitivity of the Concrete (Fog Chamber Test)

Concrete Recipe
(following the DAfStb (German Committee for Reinforced Concrete) Alkali Guideline of February 07):
Cement: CEM I 42,5 R Mainz
Stone aggregate/cement ratio: 6.0:1 parts by mass
Water-cement ratio: 0.41 (tap water)
Air entrapping agent: 0.2% of c. weight
Flow agent: 0.6% of c. weight
Air content: 5.0 vol. %
Grain Size Distribution:

| Stone aggregate | Vol. % | Remark |
|---|---|---|
| Sand 0/2 | 30 | ASR-unobjectionable |
| Crushed stone 2/8 | 12 | ASR-unobjectionable |
| Crushed stone 8/11 | 13 | ASR-reactive/coated |
| Crushed stone 11/16 | 15 | ASR-reactive/coated |
| Crushed stone 16/22 | 30 | ASR-unobjectionable |

The fractions 8/11 and 11/16 were coated as described in Example 1.

From the above concrete recipe three beams (100×100×500 mm) with measuring cones for the strain measurement are produced and stored for 24 hours at 20.0° C. Subsequently, they will be taken out of the form and put in a fog chamber at 40.0° C. and a minimum of 99% rel. humidity. The test method in the fog chamber is based on the DAfStb Alkali Guideline of February 07. The zero measurement is done at 20.0° C. directly before putting [the sample] into the fog chamber. Additional length variation measurements are taken after 1, 7, 14, 28 days and monthly up to an age of 9 months.

TABLE 1

Length variations in mm/m after different time intervals.

|   | 1 d | 7 d | 14 d | 28 d | 2 m | 3 m | 4 m | 5 m |
|---|---|---|---|---|---|---|---|---|
| A | 0.189 | 0.216 | 0.207 | 0.212 | 0.255 | 0.305 | 0.381 | 0.488 |
| B | 0.182 | 0.198 | 0.191 | 0.212 | 0.219 | 0.259 | 0.333 | 0.419 |
| C | 0.007 | 0.018 | 0.016 | 0.000 | 0.036 | 0.046 | 0.048 | 0.069 |

A: Measuring values for beams with uncoated crushed stone (comparison test).
B: Measuring values for beams with coated crushed stone pursuant to the invention.
C: Difference amounts between A and B.

Table 1 discloses that the difference of the strain between treated and untreated samples increases over time. This shows that the coating protects the grain in the selected size range against ASR.

Example 4

Examination of the Flexural Strength

Pursuant to the concrete recipe in Example 3, beams (700×150×150 mm) were produced to determine the flexural strength. According to DIN EN 12390-5 (February 2001), the flexural strength is examined after 28 days of water storage. A flexural strength of 6.6 N/mm$^2$ was measured for a beam with uncoated crushed stone in the comparison test, while a flexural strength of 7.1 was measured for a beam with coated crushed stone. That means that the coating of the stone aggregate does not affect the flexural strength of the concrete significantly.

Example 5

Examination of the Resistance to Freeze-Thaw with De-Icing Salt

The examination was done by way of the CDF method. Test bodies for the CDF method were also produced according to the same recipe, but instead of the ⅛/11 and 11/16 grain size, a ⅜/16 lime grit (once dried and once moist, both coated and uncoated) was used and twice the amount of flow agent. The procedure is carried out following DIN CEN/TS 12390-9 (August 2006).

TABLE 3

Weathering of different test bodies

|  | Lime grit dry | Lime grit humid | Lime grit dry coated | Lime grit moist coated |
|---|---|---|---|---|
| Weathering after 28 FTW [g/m$^2$] | 104 | 119 | 96 | 70 |

Therefore, the coating of the stone aggregate has no significant influence on the weathering of the concrete.

The invention claimed is:

1. A concrete aggregate for improving the stability of concrete against an alkali-silica reaction, the concrete aggregate comprising:
   a mineral aggregate coated with a coating, the coating comprising:
      an organic polymer; and
      a lithium salt additive that provides the coating with an additional functionality that the concrete aggregate would not exhibit without the additive, wherein lithium ions of the lithium salt are positioned in a targeted manner onto the aggregate and are not distributed throughout the entire concrete composition.

2. The concrete aggregate pursuant to claim 1, wherein the coating has a polymer content of more than 10% by weight.

3. The concrete aggregate according to claim 1, wherein the polymer is:
   a copolymer having monomers of styrene, butadiene, ethylene, acrylate, methacrylate, crotonate, vinyl acetate, vinyl versatate, vinyl laurate, methacrylamide, and/or acrylamide; or
   an epoxy or polyurethane.

4. The concrete aggregate according to claim 1, wherein a medium grain size of the aggregate is between 8 and 40 mm.

5. The concrete aggregate according to claim 1, wherein a medium thickness of the coating is between 10 and 20 µm.

6. The concrete aggregate according to claim 1, wherein a medium grain size of the aggregate is between 8 and 32 mm.

7. A concrete composition for producing concrete, the concrete composition containing:
   (a) at least one cement,
   (b) the concrete aggregate according to claim 1, and
   (c) optionally, one or more concrete additives and/or concrete admixtures.

8. A concrete composition pursuant to claim 7, wherein the additive in the coating is at least one lithium compound and/or at least one crown ether.

9. A method for the production of concrete, comprising the steps of:
   (A) mixing of the components (a) through (c) pursuant to claim 7 with water to produce a concrete mixture,
   (B) moulding the concrete mixture, and
   (C) curing the moulded concrete mixture to a concrete.

10. Concrete produced by the method pursuant to claim 9.

* * * * *